United States Patent
Dardas et al.

(10) Patent No.: US 10,005,127 B2
(45) Date of Patent: Jun. 26, 2018

(54) POWDER IMPROVEMENT FOR ADDITIVE MANUFACTURING

(71) Applicant: United Technologies Corporation, Hartford, CT (US)

(72) Inventors: Zissis A. Dardas, Worcester, MA (US); Ying She, East Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 0 days. days.

(21) Appl. No.: 15/113,946

(22) PCT Filed: Jan. 12, 2015

(86) PCT No.: PCT/US2015/011059
§ 371 (c)(1),
(2) Date: Jul. 25, 2016

(87) PCT Pub. No.: WO2015/112365
PCT Pub. Date: Jul. 30, 2015

(65) Prior Publication Data
US 2016/0339521 A1 Nov. 24, 2016

Related U.S. Application Data

(60) Provisional application No. 61/931,295, filed on Jan. 24, 2014.

(51) Int. Cl.
*B22F 3/105* (2006.01)
*C23C 24/04* (2006.01)
(Continued)

(52) U.S. Cl.
CPC .......... *B22F 3/1055* (2013.01); *B22F 1/0014* (2013.01); *B22F 1/02* (2013.01);
(Continued)

(58) Field of Classification Search
CPC .......... B22F 1/0014; B22F 1/02; B22F 1/025; B22F 3/1055; B22F 7/008; B22F 7/02;
(Continued)

(56) References Cited

U.S. PATENT DOCUMENTS 5,296,062 A * 3/1994 Bourell ................ B23K 26/082
156/272.8
5,372,845 A * 12/1994 Rangaswamy ........... B22F 9/04
427/216

(Continued)

FOREIGN PATENT DOCUMENTS

DE 102010046468 A1 3/2012
JP 02604908 B2 4/1997
(Continued)

OTHER PUBLICATIONS

Written Opinion and International Search Report, for PCT Patent Application No. PCT/US2015/011059, dated Apr. 24, 2015, 11 pages.

(Continued)

Primary Examiner — Scott Kastler
Assistant Examiner — Vanessa T Luk
(74) Attorney, Agent, or Firm — Kinney & Lange, P.A.

(57) ABSTRACT

A method includes providing a metallic first powder having a plurality of first particles with a first mean particle diameter. A second powder added to the first powder has a plurality of second particles with a second mean particle diameter less than the first mean particle diameter. Energy is applied to at least the second powder so as to selectively heat the second particles. The first powder is combined with the heated second powder to form a modified powder including modified powder particles. Modified powder particles have an interior portion containing an interior composition, and (Continued)

an outer surface portion with an outer composition different from the interior composition.

14 Claims, 4 Drawing Sheets

(51) Int. Cl.
| | |
|---|---|
| *B23K 26/342* | (2014.01) |
| *B22F 1/02* | (2006.01) |
| *B33Y 70/00* | (2015.01) |
| *B33Y 10/00* | (2015.01) |
| *B22F 1/00* | (2006.01) |
| *B22F 7/00* | (2006.01) |
| *B23K 15/00* | (2006.01) |
| *B23K 26/00* | (2014.01) |
| *B29C 64/153* | (2017.01) |

(52) U.S. Cl.
CPC .......... *B22F 7/008* (2013.01); *B23K 15/0086* (2013.01); *B23K 15/0093* (2013.01); *B23K 26/0006* (2013.01); *B23K 26/342* (2015.10); *B33Y 10/00* (2014.12); *B33Y 70/00* (2014.12); *C23C 24/04* (2013.01); *B22F 2301/052* (2013.01); *B22F 2301/15* (2013.01); *B22F 2301/20* (2013.01); *B22F 2301/205* (2013.01); *B22F 2302/105* (2013.01); *B22F 2302/20* (2013.01); *B22F 2998/10* (2013.01); *B29C 64/153* (2017.08); *Y02P 10/295* (2015.11)

(58) Field of Classification Search
CPC .............. B22F 2303/20; B22F 2303/25; B22F 2303/30; B22F 2999/00; B33Y 10/00; B33Y 70/00; C23C 4/04; C23C 4/06; C23C 4/067; C23C 4/073; C23C 4/08; C23C 4/10; C23C 4/11; C23C 8/60; C23C 8/62; C23C 8/64; C23C 8/66; C23C 8/68; C23C 8/70; C23C 8/72; C23C 8/74; C23C 8/76; C23C 8/78; C23C 10/28; C23C 10/30; C23C 10/32; C23C 10/34; C23C 10/36; C23C 10/38; C23C 10/40; C23C 10/42; C23C 10/44; C23C 10/46; C23C 10/48; C23C 10/50; C23C 10/52; C23C 10/54; C23C 10/56; C23C 10/58; C23C 12/00; C23C 12/02; C23C 30/00

See application file for complete search history.

(56) References Cited

U.S. PATENT DOCUMENTS

| | | | |
|---|---|---|---|
| 6,444,259 B1 * | 9/2002 | Subramanian | .......... C23C 24/04 427/191 |
| 6,652,967 B2 * | 11/2003 | Yadav | ...................... B01J 12/02 427/201 |
| 7,425,287 B2 | 9/2008 | Kogoi et al. | |
| 8,591,986 B1 | 11/2013 | Ajdelsztajn et al. | |
| 2004/0079194 A1 | 4/2004 | Nakata et al. | |
| 2006/0159896 A1 * | 7/2006 | Pfeifer | ................. B22F 1/0059 428/206 |
| 2007/0290409 A1 | 12/2007 | Brice et al. | |
| 2007/0290909 A1 | 12/2007 | Jungerman | |

FOREIGN PATENT DOCUMENTS

| | | | |
|---|---|---|---|
| KR | 20070020808 A | 2/2007 | |
| WO | 8402483 A1 | 7/1984 | |
| WO | WO 2007021091 A1 * | 2/2007 | ............. C23C 24/04 |
| WO | WO2010058200 A1 | 5/2010 | |

OTHER PUBLICATIONS

International PReliminary Report on Patentability, for PCT Application No. PCT/US2015/011059, dated Jul. 26, 2016, 7 pages.

Extended European Search Report for EP Application No. 15740404.7, dated Sep. 21, 2017, 8 pages.

* cited by examiner

POWDER IMPROVEMENT FOR ADDITIVE MANUFACTURING

BACKGROUND

The described subject matter relates generally to powder metallurgy, and more specifically to additive manufacturing employing metal powders.

Current approaches for additive manufacturing (AM) processes employing metal powders (Cold Spray, DMLS, etc.) use the powder either as received or degassed (typically under vacuum or inert gas) or passivated (usually by surface oxidation). In these cases, the best mechanical properties which can be obtained are those of the base material, presuming that all surface contamination, adsorbed moisture and hydroxides have been successfully removed or play a negligible effect to these properties. Processes to remove surface moisture and hydroxides from metal powders have been already disclosed. The desire to produce parts from metal powders by AM processes having enhanced mechanical properties, at least equal or better than those of the baseline powder, still remains.

SUMMARY

A method includes providing a metallic first powder having a plurality of first particles with a first mean particle diameter. A second powder added to the first powder has a plurality of second particles with a second mean particle diameter less than the first mean particle diameter. Energy is applied to at least the second powder so as to selectively heat the second particles. The first powder is combined with the heated second powder to form a modified powder including modified powder particles. Modified powder particles have an interior portion containing an interior composition, and an outer surface portion with an outer composition different from the interior composition.

A method for operating an additive manufacturing apparatus includes providing a metallic first powder material having a mean diameter of more than about 500 nm to a working surface of the additive manufacturing apparatus. A second powder material is added to the working surface which has a mean diameter of less than about 100 nm. An energy beam is directed to apply energy to at least the second powder material so as to selectively heat the second particles. The first powder is combined with the heated second powder to form a modified powder including modified powder particles. The modified particles have an interior portion containing an interior composition, and an outer surface portion with an outer composition different from the interior composition.

A method for manufacturing a bulk material includes providing a metallic first powder having a plurality of first particles with a first mean particle diameter. A second powder added to the first powder has a plurality of second particles with a second mean particle diameter less than the first mean particle diameter. Energy is applied to at least the second powder so as to selectively heat the second particles. The first powder is combined with the heated second powder to form a modified powder including modified powder particles. Modified powder particles have an interior portion containing an interior composition, and an outer surface portion with an outer composition different from the interior composition. The modified powder particles are accelerated through a cold spray apparatus, and are directed toward a substrate.

DETAILED DESCRIPTION

The best properties of a bulk material produced by additive manufacturing, assuming removal of surface contamination, porosity, and moisture, are limited, particularly during production when certain other properties may be desirable to facilitate a particular process such as additive manufacturing or spraying. Applying a surface treatment to particles allows for improved manufacturing while retaining many or all of the desired bulk material properties.

Figure 1:
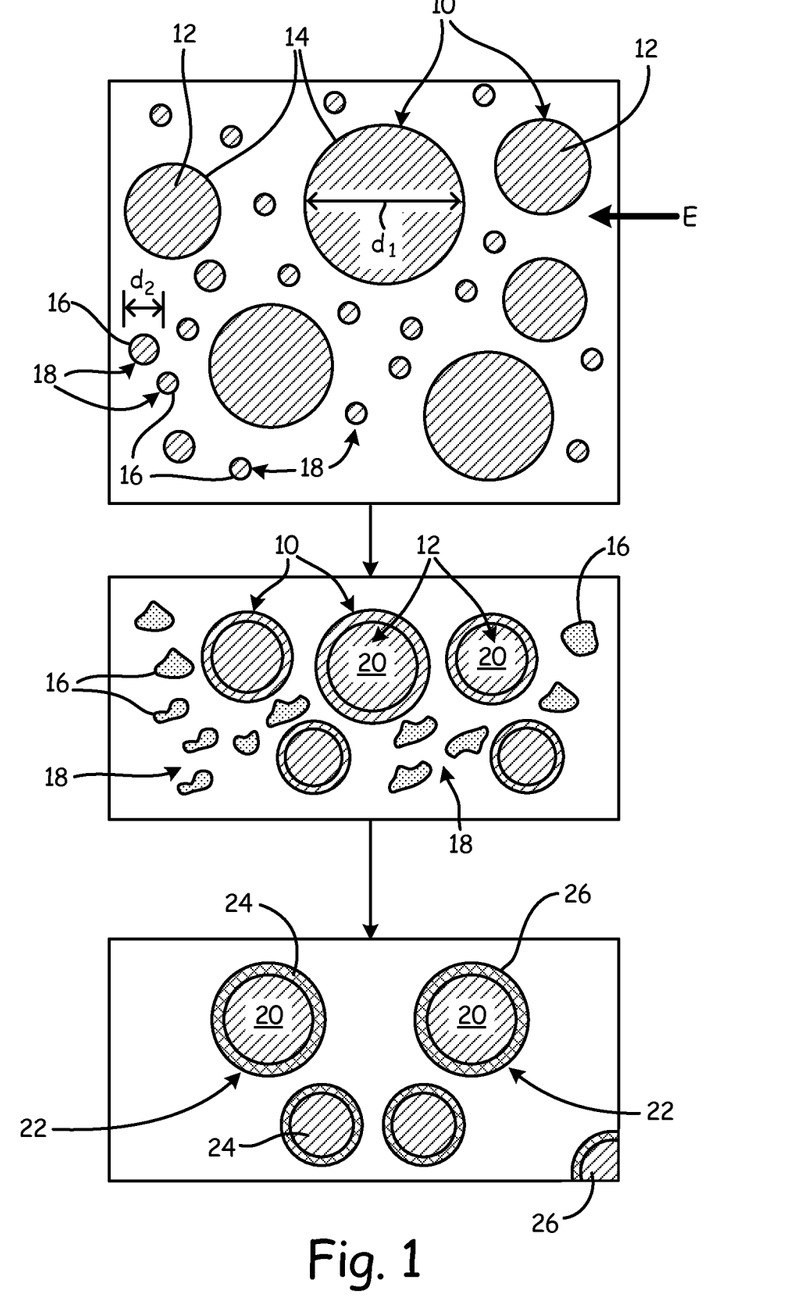
FIG. 1 shows modification of a powder for use in making at least part of a bulk material.

FIG. 1 shows provided first particles 12 of metallic first powder material 10 having first mean diameter $d_1$, and second particles 16 of second powder material 18 having a second mean diameter $d_2$, in which $d_2$ is generally less than first mean diameter $d_1$.

Particles 12 of first powder material 10 are generally intended for use, for example in an additive manufacturing process to form a bulk material, or can be applied either by additive manufacturing or by a spray to form a coating for a bulk material. However, the bulk properties of first powder material 10 formed from first particles 12 are generally limited by the bulk composition. For example, first powder material 10 may have a composition suitable for forming a thermal barrier coating onto a substrate. However, first particles 12 may be have a hardness which is too high to facilitate efficient spraying (due lack of plastic deformation) without undue loss of material. In other cases, it can be difficult for first powder material 12 to penetrate or agglomerate together about first particle perimeters 14. This may be due to relatively low thermal conductivity or other issues which increase energy consumption during production. Thus it would be helpful to improve certain surface properties of first particles 12 without substituting or changing the composition (and resulting properties) of the bulk material.

To alter outer surface properties of first particles 12, second particles 16 of second powder material 18 can be introduced in various process environments. Second powder material 18 can, for example, be a second composition (or a precursor thereof) which can operate as an outer layer or surface layer for particles 10 prior to or during consolidation.

Energy can then be applied to at least some of second powder material 18 so as to selectively melt second particles 16 of second powder material 18 while leaving at least internal portions 20 of first particles 12 unmelted. Energy can be applied in various forms and will be discussed with respect to illustrative examples.

In certain embodiments, only perimeters 14 of many first particles 12 are molten. First powder material 10 can be combined with melted second powder 18 such that particles 24 of modified powder 22 can include parts of first particles 12 of metallic first powder 10 coated with outer layer 26. Outer layer 26 can be either melted second powder material 18, or a new altered or alloyed composition. Second particles 16 will thus generally introduce a particular property to the outside of modified particles 24, which have improved handling of as compared to first particles 12 during a bulk manufacturing or consolidation process. In certain embodiments, second powder material 18 can be a ceramic composition or an alloying composition (or a precursor thereof), which is broken down during other steps of the process. Examples of such approaches will be discussed in turn.

Figure 2:
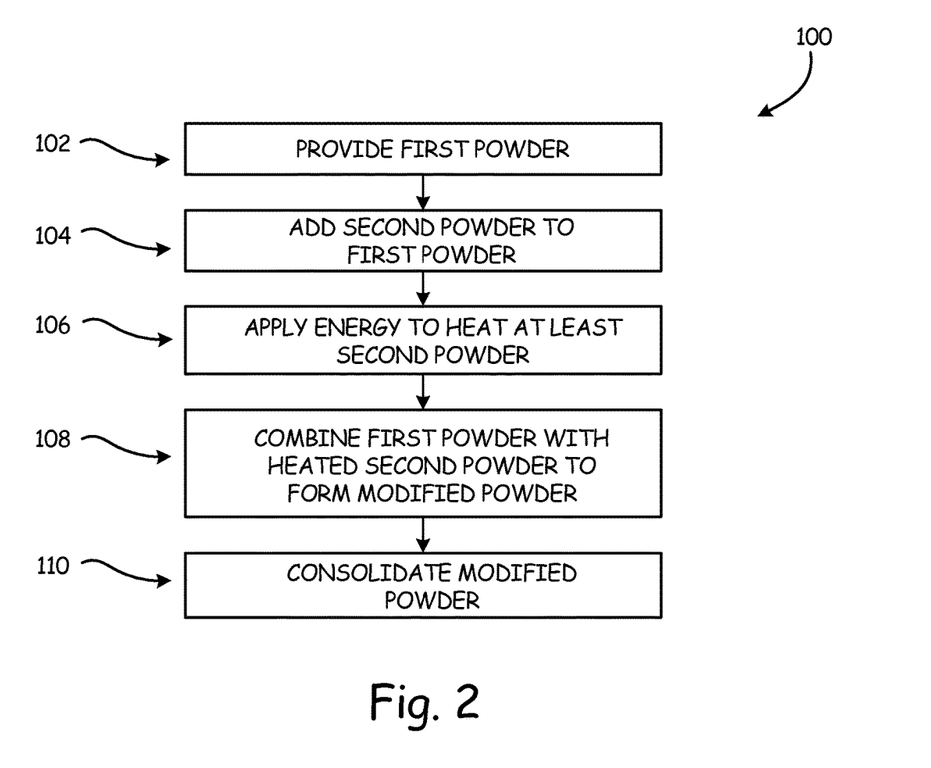
FIG. 2 is an example process chart for making a modified powder as illustrated in FIG. 1.

FIG. 2 shows a method for making a bulk material from a metallic powder. Certain steps of method 100 are illustrated in FIG. 1. Method 100 includes step 102 in which first particles of a first powder are provided, followed by step 104, where second particles of a second powder are added to the first powder. Generally speaking, a mean particle diameter of the first particles is greater than a mean particle diameter of the second particles to facilitate the combination of materials and to ensure that the bulk properties are not unduly compromised by the addition or alteration of the outer surface layer. In certain embodiments, the first particles can have a mean diameter of more than about 500 nm, while the second particles, additionally and/or alternatively, can have a mean diameter of less than about 100 nm. The nanoscale second particles provide effective mixing of particles and even coverage of the larger first particles during later steps in which the particle surface is modified.

In step 106, energy is added to at least the second powder so as to selectively heat the second particles. At least some of the second particles are then converted into a partial or complete molten state so that they can help form an outer surface of the modified particles. In certain embodiments, the second particles are actually precursor compositions, and break down into an alloying element or a protective composition upon the application of sufficient energy.

Next, in step 108, the first powder and the heated second powder are combined to form a modified powder. As briefly described with respect to FIG. 1, there are two general ways that the second particles can modify surface properties of the first particles. First, upon contact, some of the melted second powder can be alloyed with partially melted outer surfaces of the first powder particles. After they are solidified, the composition of the outer surface layer contains an alloy of the first powder and at least one constituent of the second powder. Alternatively, the second particles solidify about perimeters of the first particles to form its own outer surface layer on the modified particles, while substantially maintaining the same composition on the interior portion of the modified particle. Whether the melted second powder forms an alloy or a separate outer surface layer on particles of the first powder will depend on the choice of materials and the relative phase relationships and system energy.

In one example, the first powder can be a metallic material (or precursor) selected from a group consisting of: nickel, titanium, chromium, aluminum, and alloys thereof. The second powder can include at least a second metallic material, or metal precursor(s). In the case where the second material is metallic, the second material (or resulting composition) will typically include at least one alloying element compatible with the composition making up the outer portion of the first particles. This combination provides a surface alloy which can help facilitate deposition and/or bonding of the first powder as a bulk material, while ensuring that many of the resulting bulk material properties are maintained based on the substantially identical interior portion of the modified particles. To further minimize effects on the bulk material, the alloying element can be selected to be inert to one or more properties of the bulk material in small concentrations.

In another example, the second powder can include a ceramic material (or precursor). Nonlimiting examples include boron nitride, silicon carbide, silicon nitride and combinations thereof. In this case, the ceramic (or precursor) generally does not directly interact with the composition of the first powder, and instead results in a protective coating disposed about the metallic first particles.

After forming the modified particles (step 108), step 110 includes consolidating the modified particles (i.e., a combined first powder and second powder) to form at least part of a bulk material.

In one instance, step 110 includes consolidating the modified particles via an additive manufacturing apparatus. Generally, the modified particles can be disposed onto a working surface of the additive manufacturing apparatus. For example, the modified particles can be formed separately, and prior to their introduction to the apparatus. Alternatively, combining step 108 can be done at or immediately prior to the time of their introduction onto the working surface in step 110. An illustrative example of this process is shown with respect to FIG. 3.

Regardless of whether the particles are combined separately from or with the additive manufacturing process, step 110 can include operating an energy beam in a linear manner so as consolidate the combined powders into one or more layers of a bulk material, followed by solidifying the modified powder.

Figure 4:
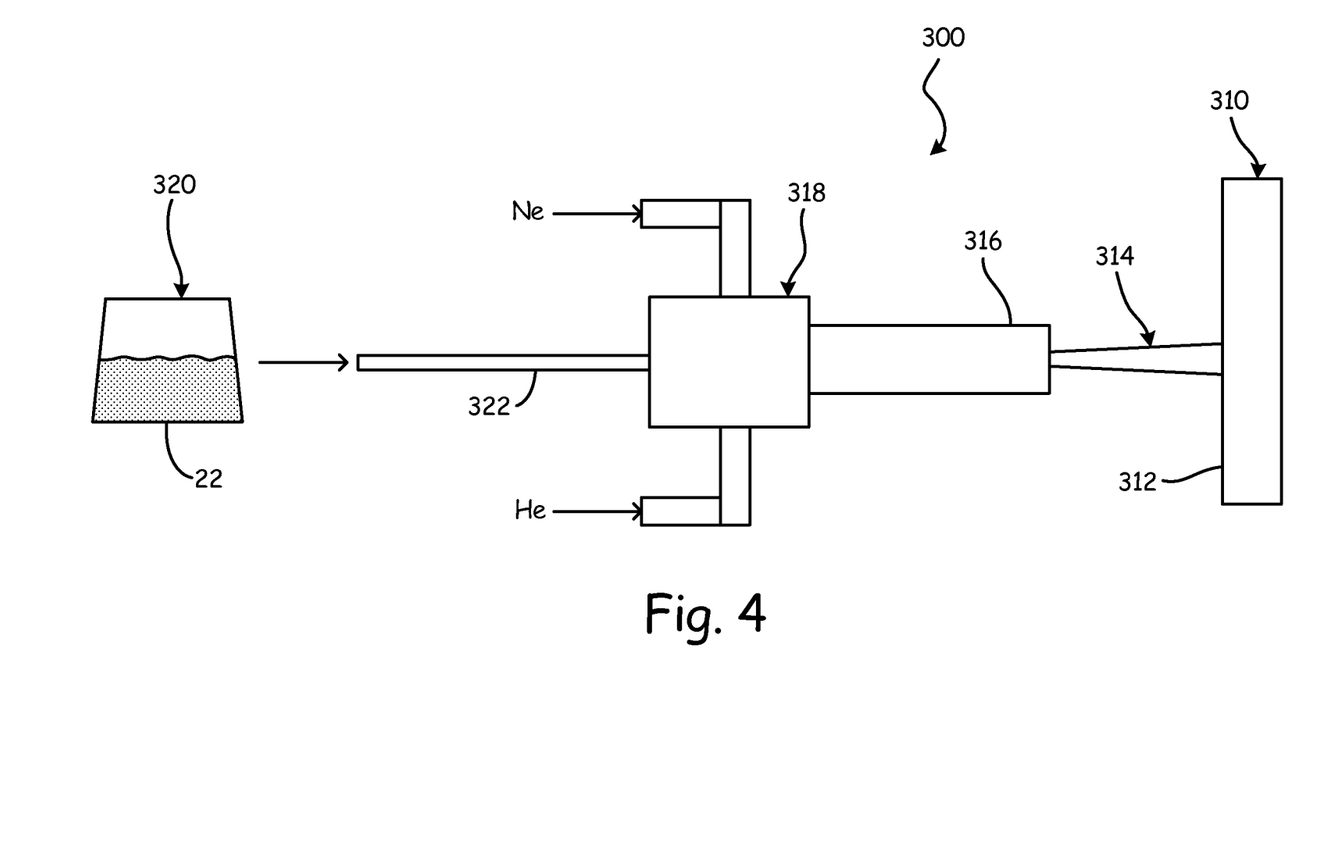
FIG. 4 shows an example cold spray apparatus for using a modified powder.

In alternative embodiments, step 110 can include placing the modified particles (combined first powder and second powder) into a feed chamber of a cold spray apparatus. A cold spray apparatus can then be operated to apply a coating to, and/or build a bulk material using the modified particles. This example is best seen in FIG. 4.

Figure 3:
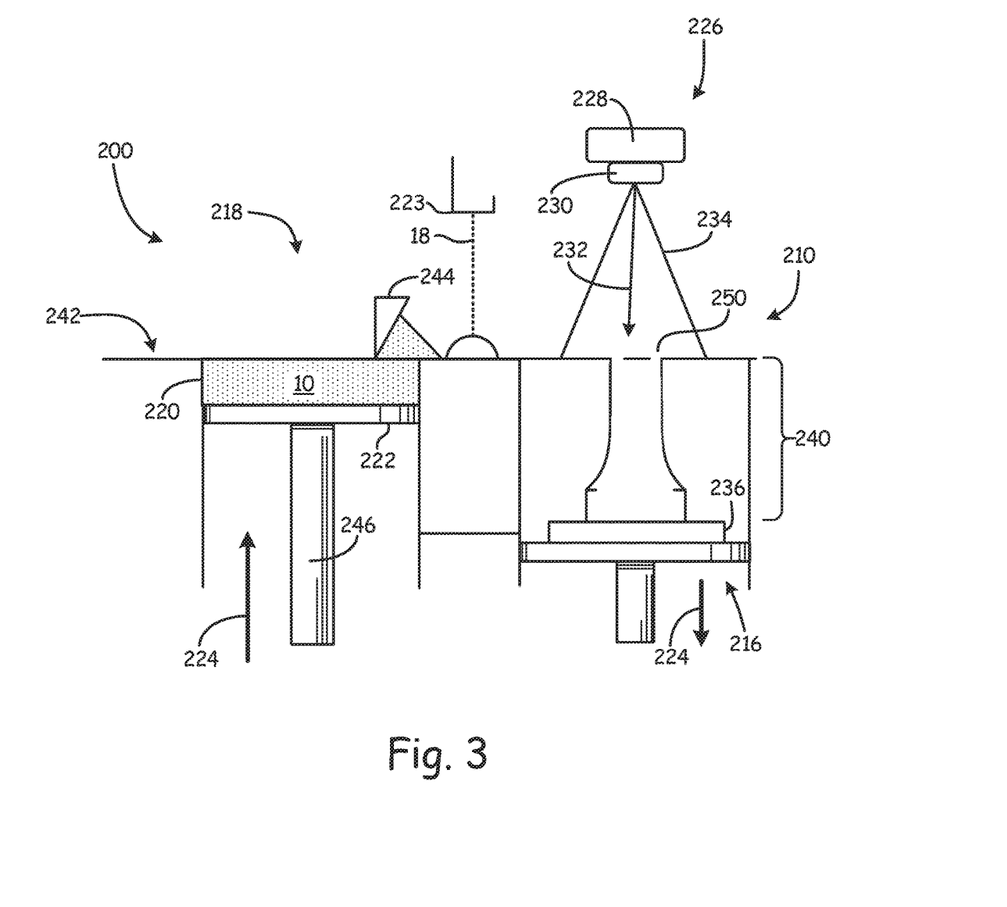
FIG. 3 schematically depicts an example additive manufacturing apparatus for using a modified powder.

FIG. 3 schematically illustrates operation of additive manufacturing apparatus 200 to form at least part of a bulk material, and in which the modified particles are incorporated to make the bulk material. FIG. 3 shows only one non-limiting example of a powder bed type additive manufacturing process and apparatus, and is not meant to limit the described subject matter to a single process or machine Embodiments of apparatus 200 utilize various additive manufacturing processes, such as but not limited to direct metal laser sintering (DMLS) manufacturing or Selective Laser Sintering (SLS) manufacturing, direct laser melting (DLM) manufacturing, selective laser melting (SLM) manufacturing, laser engineering net shaping (LENS) manufacturing, electron beam melting (EBM) manufacturing, direct metal deposition (DMD) manufacturing, and others known in the art.

Build table 210 includes movable build platform 216, which can be any object which is capable of being mounted to additive manufacturing apparatus 200 for building one or more near-net shape components. Powder delivery system 218 is capable of supplying successive quantities of metal powder to build platform 216. In this example, powder delivery system 218 includes powder compartment 220 with powder elevator platform 222 disposed proximate to, and movable opposite build platform 216. Build arrows 224 indicate that powder elevator platform 222 is movable in a first vertical direction, and build platform 216 is movable in a second vertical direction opposite the first vertical direction. However, it will be appreciated that other powder supply arrangements can be used such as those where the metal powder is injected into an energy beam before it reaches the intended working surface(s).

In the example shown in FIG. 3, operation of apparatus 200 can begin with providing metallic first powder material 10 to a working surface (e.g., movable build platform 216) of additive manufacturing apparatus 200. Second powder material 18 can be added to the working surface as well via powder injector 223 or other suitable device for combining first and second powder materials 10, 18 proximate build platform 216.

FIG. 3 shows a non-limiting example of energy beam apparatus 226 with beam generator 228 and outlet lens 230 adapted to steer energy beam 232 generally along beam path 234 toward build platform 216. This example is simplified for brevity, and it will therefore be understood that other more complex electron or laser beam configurations (e.g., steering mirrors, prisms, and/or multi-axis CNC systems) can be incorporated to operate other embodiments of energy beam apparatus 226.

After applying energy to combined first powder and second powder materials 10, 18 with energy beam 232 to selectively melt particles of second powder material 18 (and optionally outer particle surfaces of first powder material 10), the combined powder materials 10, 18 include interior portions 20 of the metallic first powder coated with outer surface layers 26 (shown in FIG. 1). In an additive manufacturing environment, the outer surface layer may remain in a partially or completely molten state to facilitate consolidation of the powder into a bulk material. However, it will be appreciated that, in certain embodiments, a first (typically low power) pass can be made with energy beam apparatus 226, prior to a higher power pass used to consolidate first and second powders 10, 18 into modified powder 22 (as shown in FIG. 1).

As noted above with respect to FIGS. 1 and 2, first and second powder materials 10, 18 can alternatively be combined into modified powder 22 prior to their provision to the working surface. In this case, modified powder 22, which may be produced by a fluidized bed process, is provided directly to powder compartment 220 in place of first powder material 10 and subsequently moved over onto build platform 216. As such, the steps of combining the particles and adding energy can be performed by the incorporated fluidized bed apparatus rather than additive manufacturing apparatus 200.

FIG. 3 also shows powder bed build plate 236 disposed on build platform 216 to serve as a substantial portion of an initial working surface for build assembly 240. A plurality of successively deposited powder build layers are provided from powder supply 242 by recoater 244 to build assembly 240. Each powder build layer can then be converted into successively formed component build layers according to a computer model, which can be stored in an STL memory file or other electronic data file accessible by a controller (not shown) of additive manufacturing apparatus 200. Selective areas of each successive deposited layer can be sintered or otherwise adhered to the preceding layer by energy beam 232. After each successive layer, recoater 244 is returned to a starting position near elevator platform 222, while supply piston 246 advances upward to expose another layer from powder supply 242, while build platform 216 indexes down by approximately one layer thickness. The process is repeated until build assembly 240 is complete with one or more near-net shape components built in a layerwise manner. Generally, each successive iteration of first and second deposition surface(s) comprise at least a portion of a preceding build layer 250. There may be some overhang and discontinuities, depending on the final build requirements and the capabilities of the build apparatus.

In another example, FIG. 4 schematically illustrates operation of cold spray apparatus 300 in which modified powder 22 can be utilized to produce at least part of a bulk component, such as in a protective coating. "Cold spray" generally refers to a class of processes also known as "cold gas dynamic spraying". Cold spray processes can be used either to coat a workpiece, and/or to form a bulk component over a mandrel having a shape corresponding to the desired shape of the bulk workpiece.

FIG. 4 shows substrate 310, which can be a workpiece or mandrel as described above. Surface 312 receives particles of modified powder 22 which have been accelerated into one or more streams 314 exiting nozzle 316 of spray gun 318. Particles of modified powder 22 can be accelerated into stream 314 using one or more pressurized inert gases such as $N_2$ and/or He as shown in FIG. 4. Prior to their introduction into the feed chamber, at least some of the first and second particles can be combined into modified particles 322 using a fluidized bed process. This process is described in detail in commonly assigned application Ser. No. 61/815,359, filed on Apr. 24, 2013, and the entirety of which is hereby incorporated by reference.

To facilitate spraying, first powder 10 and second powder 18 are combined to form modified powder 22 in a manner such as is shown and described with respect to FIGS. 1 and 2. Returning to FIG. 4, particles of modified powder 22 are fed from a hopper, chamber or other suitable powder feed device 320 through one or more feed lines 322. Modified powder can be carried through feed line(s) 322 via carrier gas. After being accelerated through nozzle 316, stream(s) 314 of modified powder 22 are deposited onto workpiece surface 312.

Cold spray process have traditionally required a limited size range of particles. Particles which are too large can distort any previously deposited materials, while smaller particles lack the momentum to penetrate a bow shock layer around surface 312. Modified particles 24 can be tailored according to embodiments of this process so that outer surface layer 26 (shown in FIG. 1) has increased or decreased hardness (relative to the underlying material). This can allow a different (e.g., wider or more cost-effective) range of particle sizes can efficiently be utilized with cold spray apparatus 300.

In one illustrative, but non-limiting example, substrate 310 is an airfoiled workpiece intended to be installed into a turbine engine. Turbine airfoils are often provided with various environmental and thermal barrier coatings to extend their useful lives under harsh operating conditions. The hardness of coatings prevents damage and penetration of foreign objects, heat, and contaminants. This hardness is also reflected in the coating particles themselves. Thus under current techniques, when some types coating particles are sprayed toward the blades, a number of compositions are too hard to effectively and efficiently be sprayed onto the desired location on the substrate, causing uneven coating application and lost particles.

In part of this example, first powder 10 (shown in FIG. 1) can include particles of a thermal barrier composition with a Vickers hardness of at least 800. Second particles 18 can include a boron precursor such as diborane. Prior to introduction into cold spray apparatus 300, boron derived from second particles 18 can be alloyed with the outer surface of the first particles (originating with a TBC composition), and forms a softer outer particle layer which helps modified powder 22 absorb the momentum imparted by spray gun 318 upon contact with another surface. By absorbing more momentum, modified powder 24 is gradually slowed as it reaches substrate 310. This causes less waste of large particles and can result in a more uniform coating. Smaller particles can also be modified with a harder outer surface to help penetrate the bow shock layer (not shown) about substrate 310.

Discussion of Possible Embodiments

The following are non-exclusive descriptions of possible embodiments of the present invention.

A method for manufacturing a component includes providing a metallic first powder having a plurality of first particles with a first mean particle diameter. A second powder added to the first powder has a plurality of second particles with a second mean particle diameter less than the first mean particle diameter. Energy is applied to at least the second powder so as to selectively heat the second particles. The first powder is combined with the heated second powder to form a modified powder including modified powder particles. Modified powder particles have an interior portion containing an interior composition, and an outer surface portion with an outer composition different from the interior composition.

The method of the preceding paragraph can optionally include, additionally and/or alternatively, any one or more of the following features, configurations and/or additional components:

A method for manufacturing a component according to an exemplary embodiment of this disclosure, among other possible things includes providing a metallic first powder having a plurality of first particles with a first mean particle diameter; adding a second powder to the first powder, the second powder having a plurality of second particles with a second mean particle diameter less than the first mean particle diameter; applying energy to at least the second powder so as to selectively heat the second particles; and combining the first powder with the heated second powder to form a modified powder including modified powder particles having an interior portion containing an interior composition, and an outer surface portion with an outer composition different from the interior composition.

A further embodiment of the foregoing method, wherein the interior composition is substantially identical to a composition of the first powder.

A further embodiment of any of the foregoing methods, wherein the outer composition is substantially identical to a composition of the heated second powder.

A further embodiment of any of the foregoing methods, wherein the outer composition includes at least some of the second powder alloyed with a portion of the first powder.

A further embodiment of any of the foregoing methods, wherein the first powder comprises a metal selected from a group consisting of: nickel, titanium, chromium, aluminum, and alloys thereof.

A further embodiment of any of the foregoing methods, wherein the second powder comprises a second metallic material or a precursor thereof.

A further embodiment of any of the foregoing methods, wherein the second metallic material is an alloying element compatible with the first metallic material.

A further embodiment of any of the foregoing methods, wherein the second powder comprises a ceramic material or a precursor thereof.

A further embodiment of any of the foregoing methods, wherein the second material comprises a ceramic material selected from a group consisting of: boron nitride, silicon carbide, silicon nitride and combinations thereof.

A further embodiment of any of the foregoing methods, further comprising: consolidating the modified powder into at least part of a bulk material.

A further embodiment of any of the foregoing methods, wherein the consolidating step comprises: disposing the combined first powder and second powder onto a working surface of an additive manufacturing apparatus; and operating an energy beam in a linear manner so as consolidate the combined powders into at least one layer of a bulk material.

A further embodiment of any of the foregoing methods, wherein the consolidating step comprises: placing the combined first powder and second powder into a feed chamber of a cold spray apparatus; and operating the cold spray apparatus to form a coating on a bulk material.

A method for operating an additive manufacturing apparatus includes providing a metallic first powder material having a mean diameter of more than about 500 nm to a working surface of the additive manufacturing apparatus. A second powder material is added to the working surface which has a mean diameter of less than about 100 nm. An energy beam is directed to apply energy to at least the second powder material so as to selectively heat the second particles. The first powder is combined with the heated second powder to form a modified powder including modified powder particles. The modified particles have an interior portion containing an interior composition, and an outer surface portion with an outer composition different from the interior composition.

The method of the preceding paragraph can optionally include, additionally and/or alternatively, any one or more of the following features, configurations and/or additional components:

A method for operating an additive manufacturing apparatus according to an exemplary embodiment of this disclosure, among other possible things includes providing a metallic first powder material having a mean diameter of more than about 500 nm to a working surface of the additive manufacturing apparatus; adding a second powder material to the working surface, the second powder material having a mean diameter of less than about 100 nm; directing an energy beam to apply energy to at least the second powder material so as to selectively heat the second particles; and combining the first powder with the heated second powder to form a modified powder including modified powder particles having an interior portion containing an interior composition, and an outer surface portion with an outer composition different from the interior composition.

A further embodiment of the foregoing method, wherein the metallic first powder comprises a metal selected from a group consisting of: nickel, titanium, chromium, aluminum, and alloys thereof.

A further embodiment of any of the foregoing methods, wherein the second powder comprises a second metallic material or a precursor thereof.

A further embodiment of any of the foregoing methods, wherein the second powder comprises a ceramic material.

A further embodiment of any of the foregoing methods, wherein the second material comprises a ceramic material selected from a group consisting of: boron nitride, silicon carbide, silicon nitride, and combinations thereof.

A method for manufacturing a bulk material includes providing a metallic first powder having a plurality of first particles with a first mean particle diameter. A second powder added to the first powder has a plurality of second particles with a second mean particle diameter less than the first mean particle diameter. Energy is applied to at least the second powder so as to selectively heat the second particles.

The first powder is combined with the heated second powder to form a modified powder including modified powder particles. Modified powder particles have an interior portion containing an interior composition, and an outer surface portion with an outer composition different from the interior composition. The modified powder particles are accelerated through a cold spray apparatus, and are directed toward a substrate.

The method of the preceding paragraph can optionally include, additionally and/or alternatively, any one or more of the following features, configurations and/or additional components:

A method for forming at least part of a bulk material with a cold spray apparatus according to an exemplary embodiment of this disclosure, among other possible things includes providing a metallic first powder having a plurality of first particles with a first mean particle diameter; adding a second powder to the first powder, the second powder having a plurality of second particles with a second mean particle diameter less than the first mean particle diameter; applying energy to at least the second powder so as to selectively heat the second particles; combining the first powder with the heated second powder to form a modified powder including modified powder particles having an interior portion containing an interior composition, and an outer surface portion with an outer composition different from the interior composition; accelerating the modified powder particles through the cold spray apparatus; and directing the accelerated powder particles toward a substrate.

A further embodiment of the foregoing method, wherein the metallic first powder comprises a metal selected from a group consisting of: nickel, titanium, chromium, aluminum, and alloys thereof.

A further embodiment of any of the foregoing methods, wherein the second powder comprises a second metallic material.

A further embodiment of any of the foregoing methods, wherein the second metallic material comprises at least one alloying composition compatible with the first metallic material.

A further embodiment of any of the foregoing methods, wherein the second powder comprises a ceramic material.

A further embodiment of any of the foregoing methods, wherein the second material comprises a ceramic material selected from a group consisting of: boron nitride, silicon carbide, silicon nitride and combinations thereof.

Although the present invention has been described with reference to preferred embodiments, workers skilled in the art will recognize that changes may be made in form and detail without departing from the spirit and scope of the invention.

The invention claimed is:

1. A method for forming at least a part of a bulk material, the method comprising:
   providing a metallic first powder having a plurality of first powder particles with a first mean particle diameter and a first metallic composition;
   adding a second powder to the first powder, the second powder having a plurality of second powder particles with a second mean particle diameter less than the first mean particle diameter and a second composition;
   applying thermal energy via an additive manufacturing apparatus so as to selectively heat each of the second particles and an outer surface of each of the first particles;
   combining the first powder particles with the second powder particles to form a modified powder including a plurality of modified powder particles each having an outer surface portion covering an interior portion containing an interior metallic composition, the outer surface portion containing an outer composition different from the interior metallic composition; and
   consolidating the plurality of modified powder particles into at least part of a bulk material;
   wherein the interior metallic composition is substantially identical to the first metallic composition;
   wherein the method is performed on a working surface of an additive manufacturing apparatus:
   wherein the steps of applying energy and combining the first powder particles with the second powder particles comprise:
      operating an energy beam at a first, low-energy setting; and
      directing the beam toward the first powder particles and the second powder particles on the working surface so as to selectively heat and combine the first and second powder particles into the plurality of modified powder particles; and
      wherein the consolidating step comprises operating the energy beam at a second, high-energy setting in a linear manner over the working surface so as to consolidate the plurality of modified powder particles into at least one layer of the bulk material.

2. The method of claim 1, wherein the outer surface portion is a composite coating covering the interior portion, with the outer composition including particles substantially identical to the second composition.

3. The method of claim 2, wherein the second powder particles comprise a ceramic material or a precursor thereof.

4. The method of claim 3, wherein the ceramic material is selected from a group consisting of: boron nitride, silicon carbide, silicon nitride and combinations thereof.

5. The method of claim 1, wherein the outer composition is an alloy coating covering the interior portion, and includes at least some of the second powder particles alloyed with the heated outer surface of each of the first powder particles.

6. The method of claim 5, wherein the second powder particles comprise a second metallic material or a precursor thereof.

7. The method of claim 6, wherein the second metallic material is an alloying element compatible with the first metallic composition.

8. The method of claim 1, wherein the first metallic composition is selected from a group consisting of: nickel, titanium, chromium, aluminum, and alloys thereof.

9. The method of claim 1, wherein the consolidating step further comprises:
   placing the plurality of modified powder particles into a feed chamber of a cold spray apparatus; and
   operating the cold spray apparatus to form a thermal barrier coating on a bulk material from the plurality of modified powder particles.

10. A method for operating an additive manufacturing apparatus to form at least part of a bulk material, the method comprising:
    providing a metallic first powder material having a plurality of first particles with a first metallic composition and a first mean particle diameter of more than about 500 nm to a working surface of the additive manufacturing apparatus;
    adding a second powder material to the working surface, the second powder material having a plurality of second particles with a second composition and a second mean particle diameter of less than about 100 nm;

operating and directing an energy beam at a first, low-energy setting to apply energy to at least the second powder material so as to selectively heat each of the second particles and an outer surface of each of the first particles;

on the working surface, combining the first powder with the second powder to form a modified powder including a plurality of modified powder particles each having an outer surface portion covering an interior portion containing an interior metallic composition, the outer surface portion containing an outer composition different from the interior metallic composition; and consolidating the plurality of modified powder particles into at least part of a bulk material, the consolidating step comprising operating the energy beam at a second, high-energy setting in a linear manner so as consolidate the plurality of modified powder particles into at least one layer of the bulk material;

wherein the interior metallic composition is substantially identical to the first metallic composition.

11. The method of claim 10, wherein the first metallic composition is selected from a group consisting of: nickel, titanium, chromium, aluminum, and alloys thereof.

12. The method of claim 10, wherein the second composition comprises a second metallic composition or a precursor thereof.

13. The method of claim 10, wherein the second composition comprises a second ceramic composition.

14. The method of claim 13, wherein the second ceramic composition is selected from a group consisting of: boron nitride, silicon carbide, silicon nitride, and combinations thereof.

* * * * *